US009642234B2

(12) United States Patent
Lee et al.

(10) Patent No.: US 9,642,234 B2
(45) Date of Patent: May 2, 2017

(54) EUV LIGHT GENERATOR APPARATUS HAVING A DROPLET GENERATOR CONFIGURED TO CONTROL A DROPLET POSITION USING A MAGNETIC FIELD

(71) Applicant: Samsung Electronics Co., Ltd., Suwon-si, Gyeonggi-do (KR)

(72) Inventors: Seungkoo Lee, Seoul (KR); Insung Kim, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/064,942

(22) Filed: Mar. 9, 2016

(65) Prior Publication Data

US 2017/0048956 A1 Feb. 16, 2017

(30) Foreign Application Priority Data

Aug. 11, 2015 (KR) ........................ 10-2015-0113388

(51) Int. Cl.
*H05G 2/00* (2006.01)
*G02B 19/00* (2006.01)

(52) U.S. Cl.
CPC ......... *H05G 2/006* (2013.01); *G02B 19/0095* (2013.01); *H05G 2/008* (2013.01)

(58) Field of Classification Search
CPC ..... H05G 2/006; H05G 2/008; G02B 19/0095
USPC ...................................................... 250/504 R
See application file for complete search history.

(56) References Cited

U.S. PATENT DOCUMENTS

| | | | | |
|---|---|---|---|---|
| 7,271,401 | B2 | 9/2007 | Imai et al. | |
| 8,507,883 | B2 | 8/2013 | Endo et al. | |
| 2006/0192154 | A1* | 8/2006 | Algots .................. | H05G 2/003 250/504 R |
| 2008/0035865 | A1 | 2/2008 | Komori et al. | |
| 2015/0083936 | A1 | 3/2015 | Wehrens | |
| 2015/0137011 | A1 | 5/2015 | Pate et al. | |

* cited by examiner

*Primary Examiner* — Michael Maskell
(74) *Attorney, Agent, or Firm* — Myers Bigel, P.A.

(57) ABSTRACT

Described is an extreme ultraviolet (EUV) light generator apparatus. The EUV light generator apparatus includes a droplet nozzle, a central electromagnet including a central coil wound around the droplet nozzle, and a droplet generator including side electromagnets around the central electromagnet.

20 Claims, 14 Drawing Sheets

(a)

(b)

(a)

(b)

(a)

(b)

EUV LIGHT GENERATOR APPARATUS HAVING A DROPLET GENERATOR CONFIGURED TO CONTROL A DROPLET POSITION USING A MAGNETIC FIELD

CROSS-REFERENCE TO RELATED APPLICATION

This application claims priority under 35 U.S.C. §119 to Korean Patent Application No. 10-2015-0113388 filed on Aug. 11, 2015, the disclosure of which is hereby incorporated herein by reference in its entirety.

FIELD

Embodiments of the inventive concept relate to an extreme ultraviolet (EUV) light generator which has a droplet generator configured to control a droplet position using a magnetic field and EUV light.

BACKGROUND

A photolithography technology using light having an increasingly small wavelength to form fine semiconductor patterns on a wafer has been researched, developed and used. At the present, an apparatus using an extreme ultraviolet (EUV) light is a promising emerging technology. The technology includes applying a laser onto a target material to generate plasma and using the EUV light generated from the plasma. A core issue of the technology is the application of a droplet with a laser accurately but it may be difficult to align a droplet generator in order to apply the droplet with the laser accurately due to various mechanical reasons.

SUMMARY

Embodiments of the inventive concept provide an extreme ultraviolet (EUV) light generator configured to control a droplet position using a magnetic field and a reflective photolithography apparatus including the EUV light generator.

Embodiments of the inventive concept provide the EUV light generator, which is automatically self-aligned and a reflective photolithography apparatus including the EUV light generator unit.

The technical objectives of the inventive concept are not limited to the above disclosure. Other objectives may become apparent to those of ordinary skill in the art based on the following descriptions.

In accordance with an aspect of the inventive concept, an EUV light generator apparatus includes a droplet nozzle, a central electromagnet including a central coil wound around the droplet nozzle, and a droplet generator including side electromagnets around the central electromagnet.

In accordance with another aspect of the inventive concept, an EUV light generator apparatus include a chamber, a droplet generator configured to continuously shoot droplets into the chamber, a laser source configured to project a laser into the chamber to be irradiated to the droplet, a collecting mirror configured to collect EUV light generated in the chamber and reflect the EUV light to the outside, and a droplet collector configured to collect the droplets. The droplet generator includes a central electromagnet, and a first side electromagnet disposed in a first side direction of the central electromagnet and a second side electromagnet disposed in a second side direction of the first central electromagnet.

In accordance with still another aspect of the inventive concept, an EUV light generator apparatus includes a chamber, a droplet generator configured to continuously shoot droplets into the chamber, a laser source configured to project a laser into the chamber to be irradiated to the droplet, a collecting mirror configured to collect EUV light generated in the chamber and reflect the EUV light to outside, and a droplet collector configured to collect the droplets. The droplet generator includes a central electromagnet, a first side electromagnet disposed in a first side direction of the central electromagnet, and a second side electromagnet disposed in a second side direction of the central electromagnet.

Detailed items of the other embodiments of the inventive concept are included in the detailed descriptions and the accompanying drawings.

BRIEF DESCRIPTION OF THE DRAWINGS

The foregoing and other features and advantages of the inventive concepts will be apparent from the more particular description of preferred embodiments of the inventive concepts, as illustrated in the accompanying drawings in which like reference numerals denote the same respective parts throughout the different views. The drawings are not necessarily to scale, emphasis instead being placed upon illustrating the principles of the inventive concepts. In the drawings.

DETAILED DESCRIPTION OF THE EMBODIMENTS

Advantages and features of the inventive concept and methods of achieving them will be made apparent with reference to the accompanying figures and the embodiments to be described below in detail. However, the inventive concept should not be limited to the embodiments set forth herein and may be construed as various embodiments in different forms. Rather, these embodiments are provided so that disclosure of the inventive concept is thorough and complete, and fully conveys the inventive concept to those of ordinary skill in the art. The inventive concept is defined by the appended claims.

The terminology used herein is only intended to describe embodiments of the inventive concept and not intended to limit the scope of the inventive concept. As used herein, the singular forms “a,” “an,” and “the” are intended to include the plural forms as well, unless specifically indicated otherwise. The terms “comprises” and/or “comprising” that are used herein specify the presence of mentioned elements, steps, operations, and/or devices, but do not preclude the presence or addition of one or more of other elements, steps, operations, and/or devices.

Spatially relative terms, such as "below," "beneath," "lower," "above," "upper," and the like, may be used herein to easily describe the correlation between one device or element and another device or other elements as illustrated in the figures. The spatially relative terms should be understood as terms that include different orientations of the device in additional usage or operation of the orientations illustrated in figures. For example, when the device illustrated in the figures is turned over, the device described as disposed "below" or "beneath" another device may be disposed "above" the other device.

Further, like numbers refer to like elements throughout the entire text herein. Thus, the same or similar numbers may be described with reference to other figures even if those numbers are neither mentioned nor described in the corresponding figures. Further, elements that are not denoted by reference numbers may be described with reference to other figures.

Figure 1:
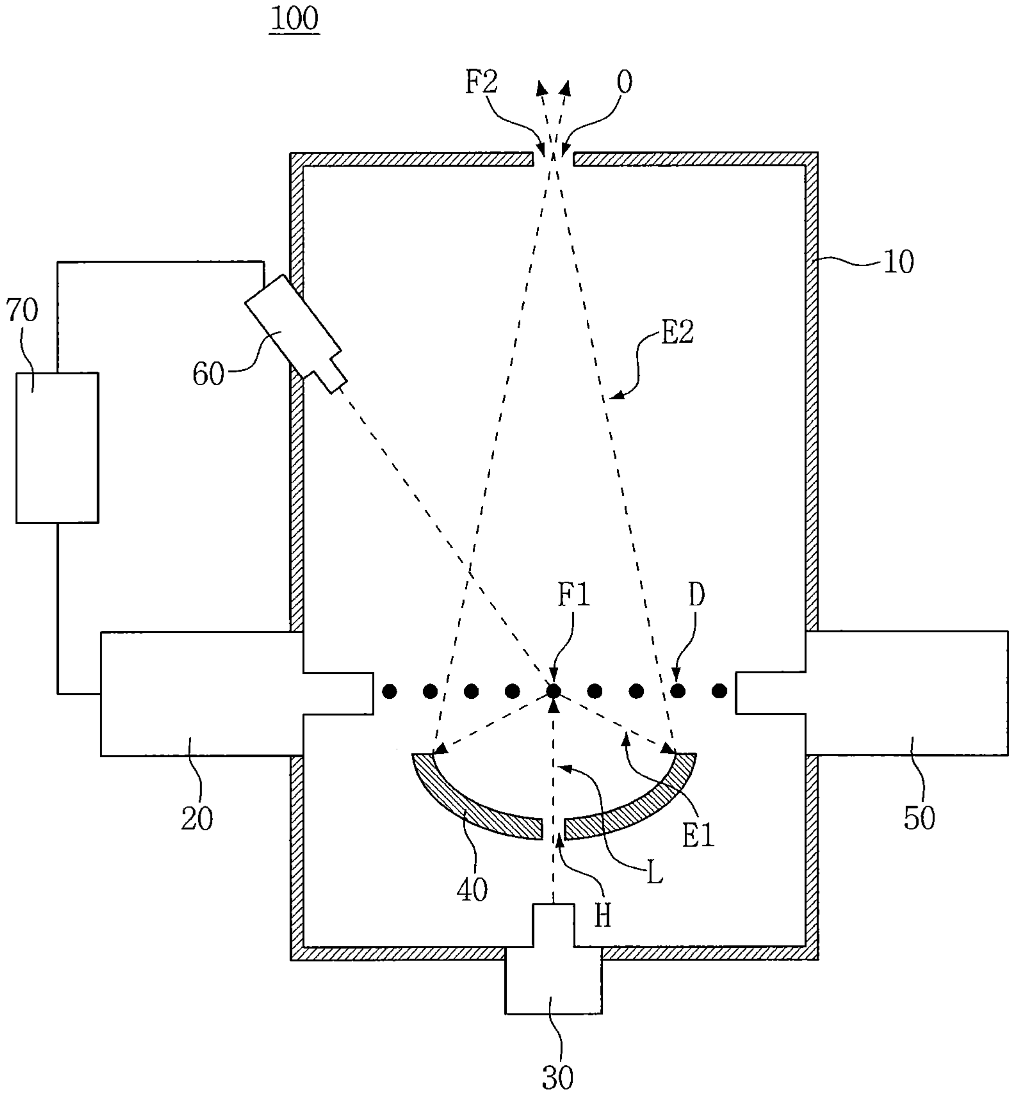
FIG. 1 is a view conceptually illustrating an extreme ultraviolet (EUV) light generator according to an embodiment of the inventive concept.

FIG. 1 is a view conceptually illustrating an extreme ultraviolet (EUV) light generator 100 according to an embodiment of the inventive concept. Referring to FIG. 1, the EUV light generator 100 according to the embodiment of the inventive concept may include a chamber 10, a droplet generator 20, a laser source 30, a collecting mirror 40, and a droplet collector 50.

Inside of the chamber 10 may have a lower pressure than outside of the chamber 10. Plasma may be generated in the chamber 10. The droplet generator 20 may continuously regularly shoot droplets D into the chamber 10 in a horizontal direction with a cycle of about 50 Hz frequency toward the droplet collector 50. The droplets D may include liquid tin (Sn). The droplet generator 20 will be described below in detail.

The laser source 30 may apply a $CO_2$ laser, an Nd:YAG laser, or other various lasers in the form of pulses into the chamber 10. For example, the laser source 30 may apply a $CO_2$ laser in the form of pulse with a cycle of about 50 Hz frequency into the chamber 10. The laser L may be irradiated passing through a center hole of the collecting mirror 40 to a droplet D which passes a first focus F1 of the collecting mirror 40. The laser L which collides with the droplet D in the first focus F1 may generate plasma. EUV light E1 may be generated from the plasma. A beam spot diameter of the laser L may be about three to five times of an average diameter of the droplets D. For example, when the average diameter of the droplets D is about 30 μm, the beam spot diameter of the laser L is in a range of about 90 μm to 150 μm.

The collecting mirror 40 may have a concave parabolic reflective surface in order to have the first focus F1 and a second focus F2. The collecting mirror 40 may reflect the EUV light E1 to the second focus F2. The EUV light E2 reflected from the collecting mirror 40 may be irradiated outside the chamber 10 through an outlet hole O.

The droplet collector 50 may collect the droplets D exposed to the laser L irradiated from the laser source 30. The droplet collector 50 may have a magnetic material such as an electromagnet to attract the droplets D.

The EUV light generator apparatus 100 may further include an image camera 60 and a droplet generator controller 70. The image camera 60 may obtain an image of the droplet D to which the laser L is irradiated in the first focus F1 of the collecting mirror 40. The droplet generator controller 70 may analyze the image obtained from the image camera 60 and finely adjust a direction and frequency in which the droplet generator 20 shoots the droplets D. For example, uniform plasma and EUV light E1 may be generated as the center of the beam spot of the laser L and the center of the droplets D match. Therefore, the droplet generator controller 70 may finely adjust the aiming direction and frequency of the droplet generator 20 according to information on superposition and locations of the laser L and the droplets D obtained by the image camera 60. The droplet generator controller 70 may mechanically control the droplet generator 20 using a servomotor, and electromagnetically control the droplet generator 20 using an electromagnet, etc.

Figure 2A:
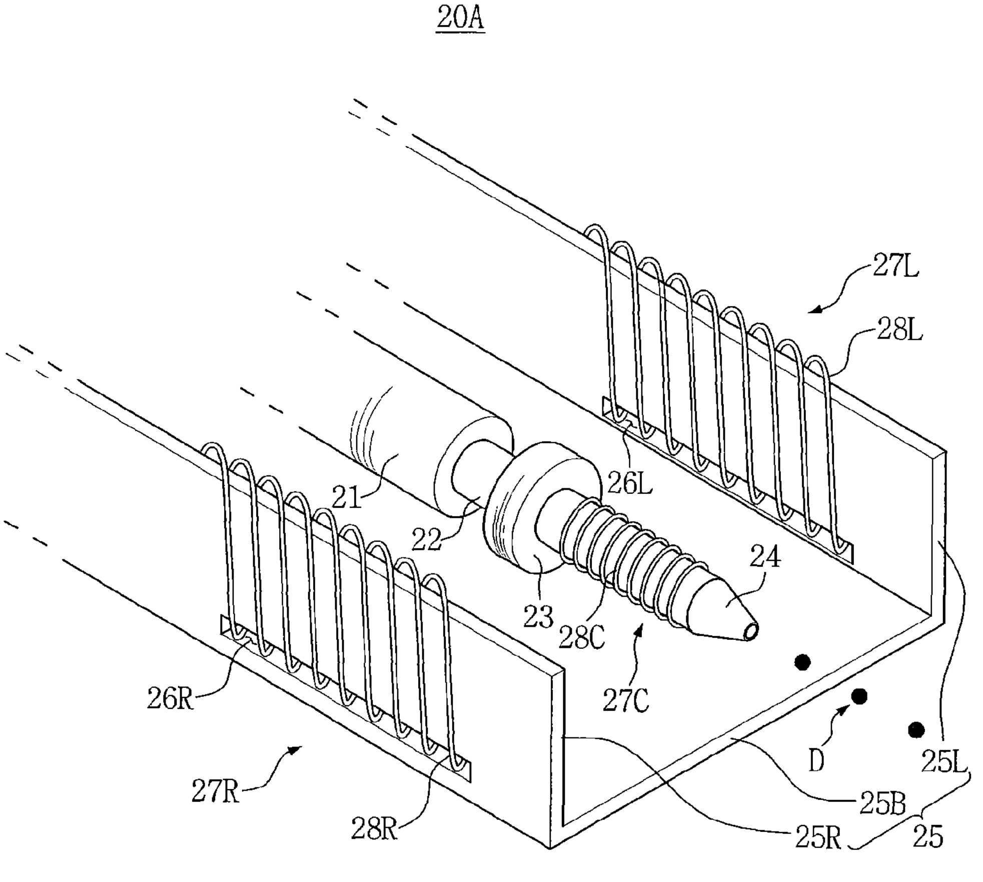
FIGS. 2A to 2F are schematic views illustrating droplet generators according to various embodiments of the inventive concept.

FIGS. 2A to 2F are schematic views illustrating droplet generators 20A to 20F according to various embodiments of the inventive concept. Referring to FIG. 2A, the droplet generator 20A according to an embodiment of the inventive concept may include a droplet source container 21, a tube 22, a shutter 23, a nozzle 24, a shroud 25, and electromagnets 27C, 27L, and 27R. The droplet source container 21 may contain a liquid droplet source, for example, such as liquid tin (Sn). The droplet source container 21 may include a heating unit which heats the droplet source at a temperature higher than the melting temperature thereof to liquefy the droplet source, and include a mechanical unit to extrude the liquid droplet source through the tube 22 and the nozzle 24. The tube 22 may deliver the liquid droplet source from the droplet source container 21 to the nozzle 24. The shutter 23 may apply pressure to the tube 22 so that the liquid droplets source will be continuously shot to the outside in droplets through the nozzle 24. For example, the shutter 23 may include a piezoelectric device such as a piezoelectric translator (PZT). The shroud 25 may be separated from the nozzle 24 and surround both sides and a bottom of the nozzle 24. The shroud 25 may include a first side plate 25L, a second side plate 25R, and a third side plate 25B which are disposed in both side directions and a bottom direction of the nozzle 24. The first side plate 25L, the second side plate 25R, and the third side plate 25B may be in a integrated type. The shroud 25 may collect droplet materials and droplet residue, which are leaked from the nozzle 24, and in order to prevent the EUV light generator apparatus 100 including the collecting mirror 40 from being contaminated by the liquid droplet residue leaked from the droplets D and the nozzle 24. The droplet source container 21, the tube 22, and the shroud 25 may include a refractory metal having a high melting temperature.

The electromagnets 27C, 27L and 27R may include a central electromagnet 27C having a central coil 28C wound around the nozzle 24, a first side electromagnet 27L spaced apart from the central electromagnet 27C and having a first side coil 28L wound around the first side plate 25L of the shroud 25, and a second side electromagnet 27R having a second side coil 28R wound around the second side plate 25R of the shroud 25. Therefore, the first side electromagnet 27L may be disposed in a first side direction of the central electromagnet 27C and the second side electromagnet 27R may be disposed in a second side direction of the central electromagnet 27C.

The central coil 28C, the first side coil 28L, and the second side coil 28R may each include a solenoid coil. The shroud 25 may have a first side slit 26L disposed between the first side plate 25L and the third side plate 25B and configured to pass through the first side coil 28L. The shroud 25 may have a second side slit 26R disposed between the second side plate 25R and the third side plate 25B and configured to pass through the second side coil 28R. The central electromagnet 27C, the first side electromagnet 27L, and the second side electromagnet 27R may have the same magnetic pole facing the same direction to have mutually repulsive forces.

Figure 2B:
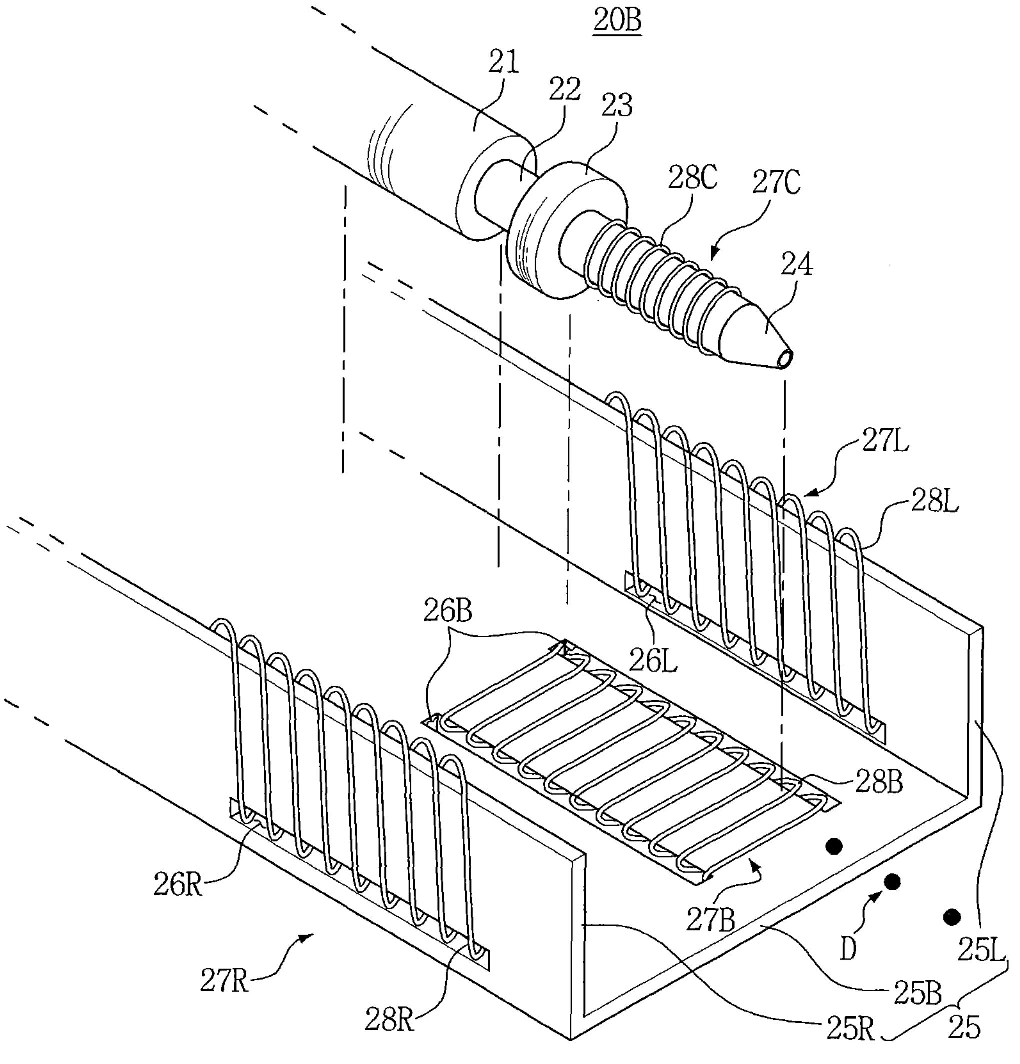

Referring to FIG. 2B, the droplet generator 20B according to an embodiment of the inventive concept, in contrast to the droplet generator 20A shown in FIG. 2A, may further include a third side electromagnet 27B having a long third side coil 28B on the third side plate 25B of the shroud 25. The third side plate 25B may include third side slits 26B passing through the third side coil 28B. The third side electromagnet 27B may have magnetic poles in the same direction as the central electromagnet 27C, the first side electromagnet 27L, and the second side electromagnet 27R.

Figure 2C:
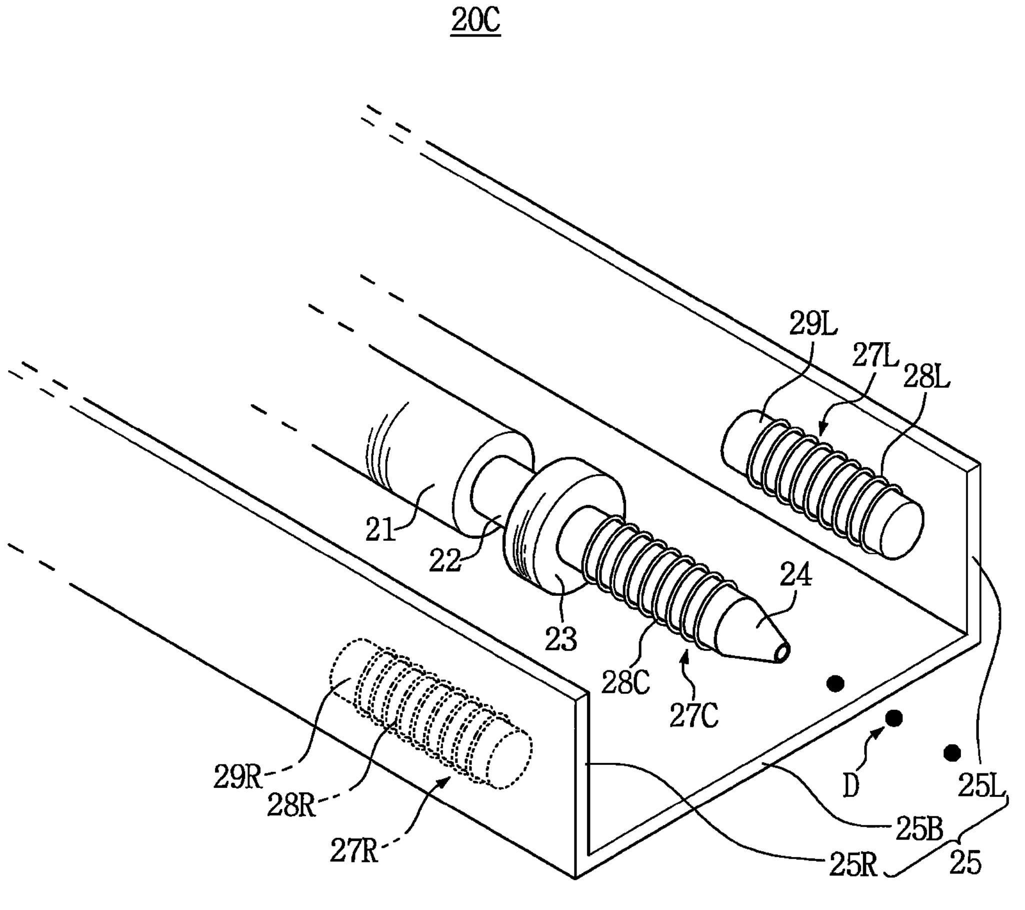

Referring to FIG. 2C, the droplet generator 20C according to an embodiment of the inventive concept, in contrast to the droplet generator 20A shown in FIG. 2A, may include the central electromagnet 27C having the central coil 28C wound around the nozzle 24, a first side electromagnet 27L adjacent to the first side plate 25L of the shroud 25, and a second side electromagnet 27R adjacent to the second side plate 25R of the shroud 25. The first side electromagnet 27L may have a first side coil 28L wound around a first side core 29L having a cylinder or bar shape. The second side electromagnet 27R may have a second side coil 28R wound around a second side core 29R having a cylinder or bar shape.

Figure 2D:
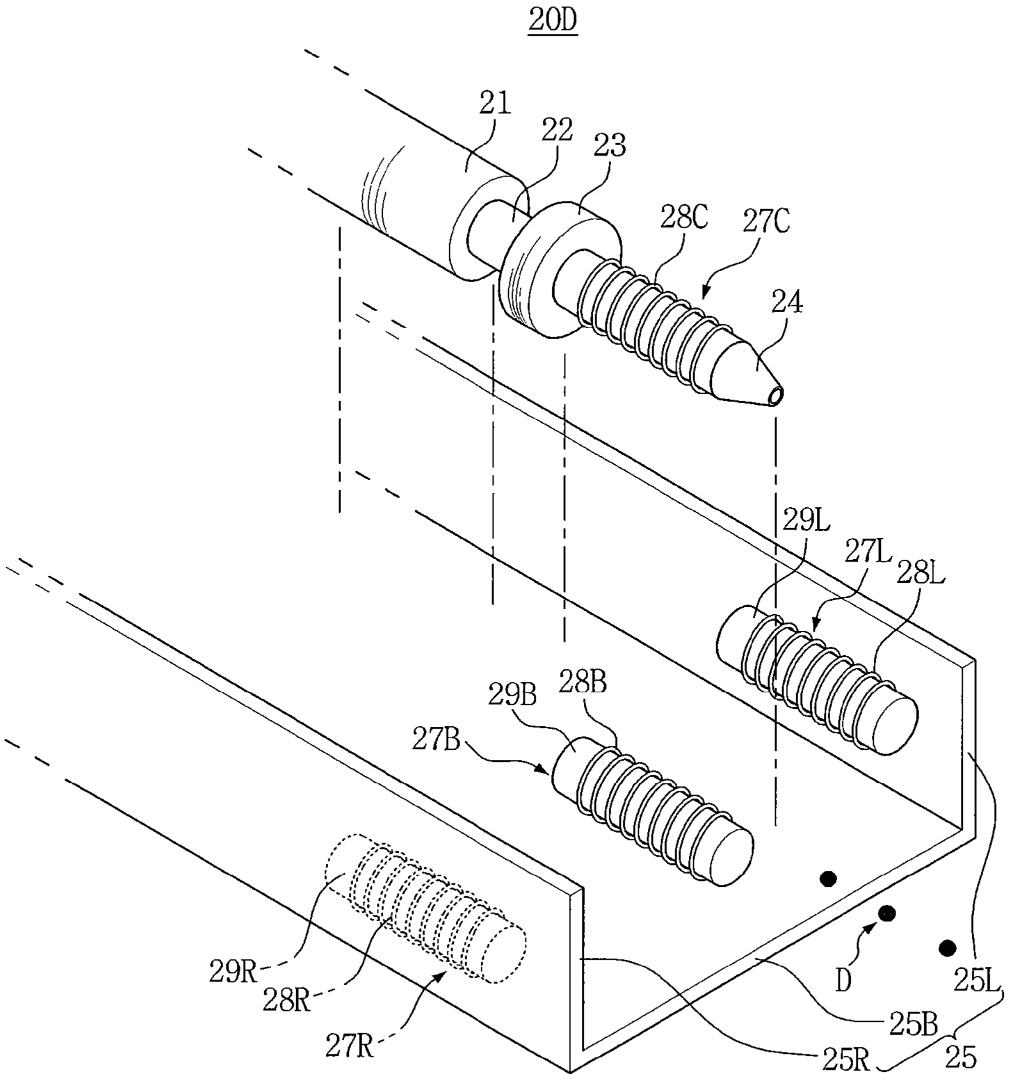

Referring to FIG. 2D, the droplet generator 20D according to an embodiment of the inventive concept, in contrast to the droplet generator 20C shown in FIG. 2C, may further include a third side electromagnet 27B adjacent to the third side plate 25B. The third side electromagnet 27B may have a third side coil 28B wound around a third side core 29B having a cylinder or bar shape.

Figure 2E:
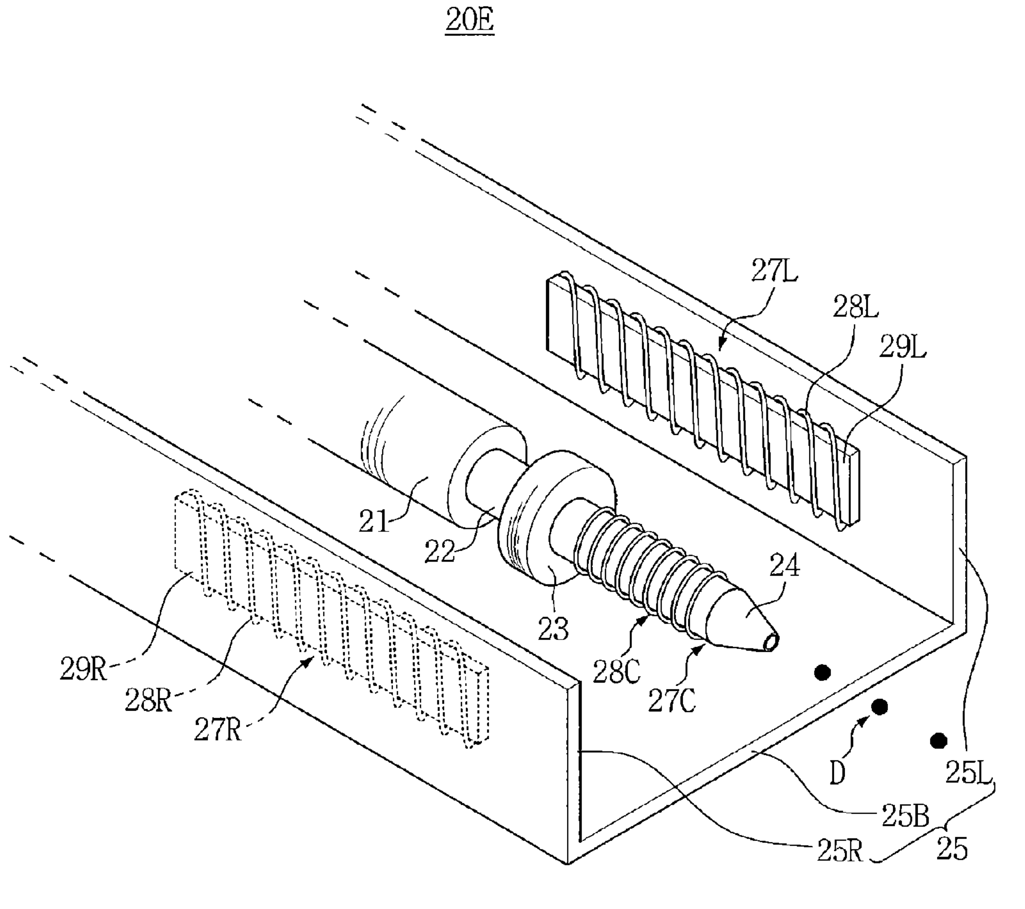

Referring to FIG. 2E, the droplet generator 20E according to one embodiment of the inventive concept, in contrast to the droplet generator 20A shown in FIG. 2A, may include a central electromagnet 27C having a central coil 28C wound around the nozzle 24, a first side electromagnet 27L adjacent to the first side plate 25L of the shroud 25, and a second side electromagnet 27R adjacent to the second side plate 25R of the shroud 25. The first side electromagnet 27L may have a first side coil 28L wound around a first side core 29L having a plate or bar shape. The second side electromagnet 27R may have a second side coil 28R wound around a second side core 29R having a plate or a bar shape.

Figure 2F:
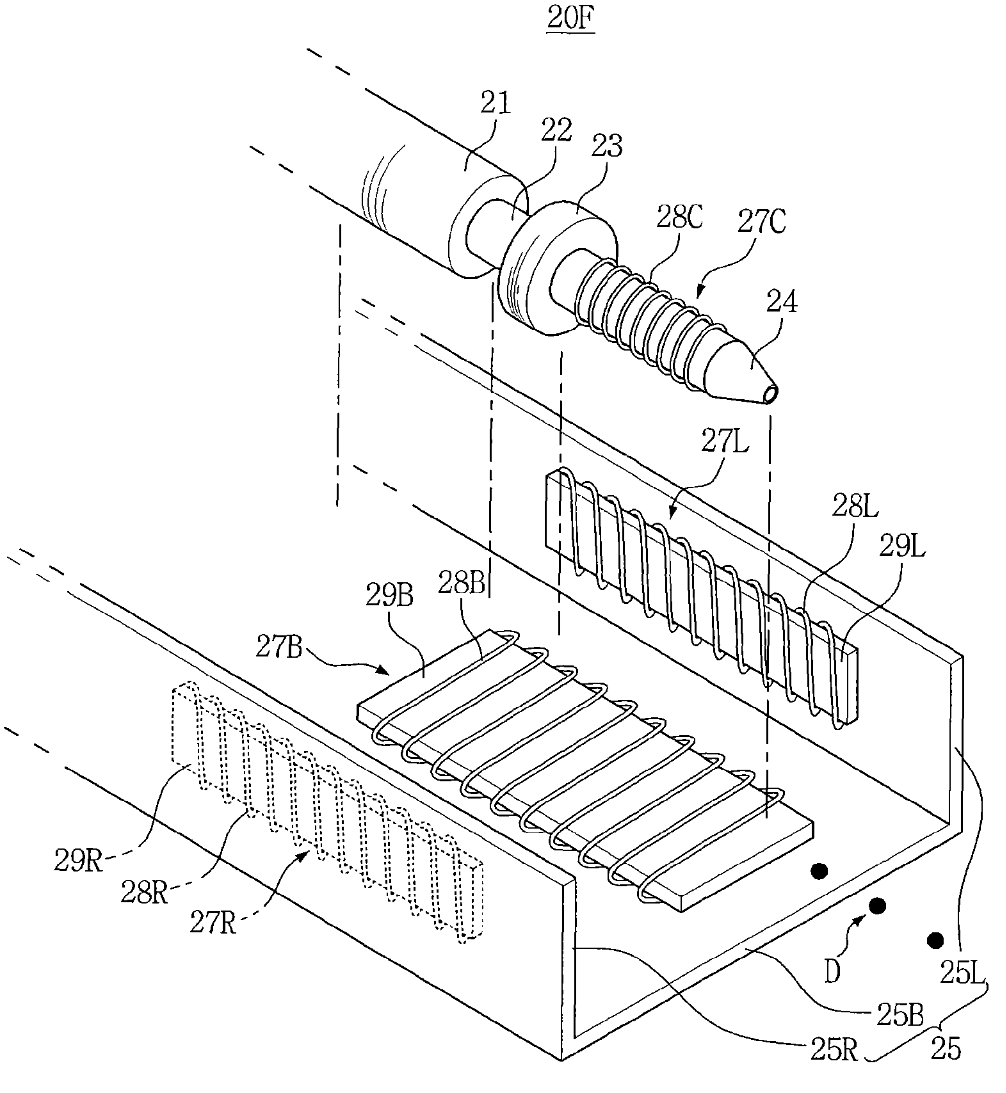

Referring to FIG. 2F, the droplet generator 20F according to one embodiment of the inventive concept, in contrast to the droplet generator 20E shown in FIG. 2E, may further include a third side electromagnet 27B adjacent to the third side plate 25B. The third side electromagnet 27B may have a third side coil 28B wound around a third side core 29B having a plate or bar shape.

The nozzles 24 of the droplet generators 20A to 20F according to various embodiments of the inventive concept may always have a certain position caused by the electromagnets 27C, 27L, 27R and 27B. For example, current sources 75C, 75L and 75R (FIGS. 4A-4D) of the droplet generator controller 70 may each control a current to adjust magnetic forces of the electromagnets 27C, 27L, 27R and 27B. Locations of the nozzles 24 in the droplet generators 20A to 20F may be finely controlled by the adjusted magnetic forces Therefore, the aiming points of the nozzles 24 may always be constantly maintained when the current flows. Since the nozzles 24 are controlled by a current not depending on a mechanical apparatus such as a motor, etc., a control response delay time becomes very short. That is, when the image obtained by the image camera 60 is analyzed and the aiming points of the nozzles 24 are controlled, the delay time is minimized and the aiming points of the nozzles 24 may be very rapidly controlled.

Since the aiming points of the nozzles 24 are controlled by a current, the aiming points of the nozzles 24 may be adjusted more finely and precisely than those of nozzles controlled by a mechanical operation.

Figure 3A:
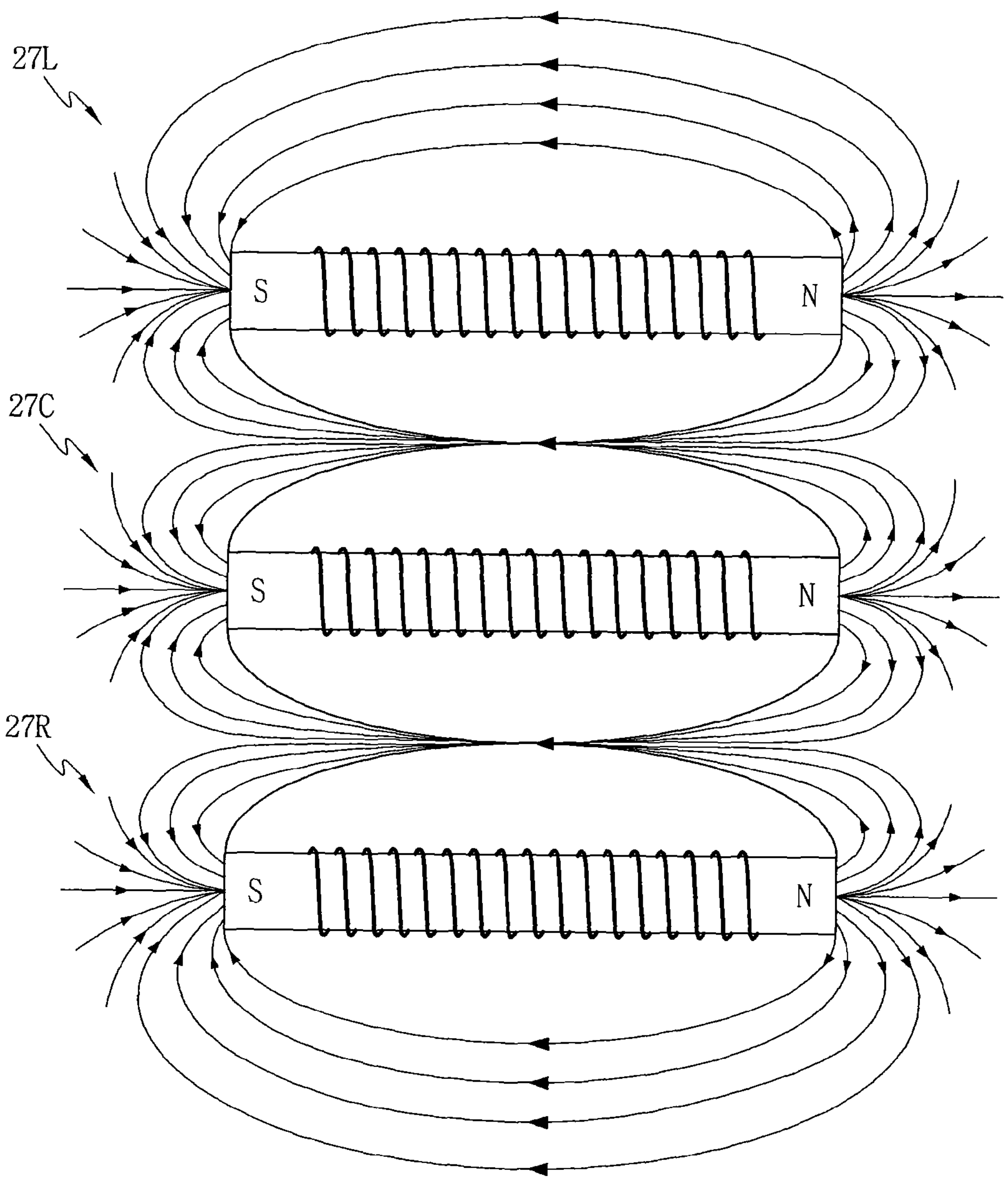
FIGS. 3A and 3B are views conceptually illustrating a magnetic field in electromagnets of droplet generators according to various embodiments of the inventive concept.
Figure 3B:
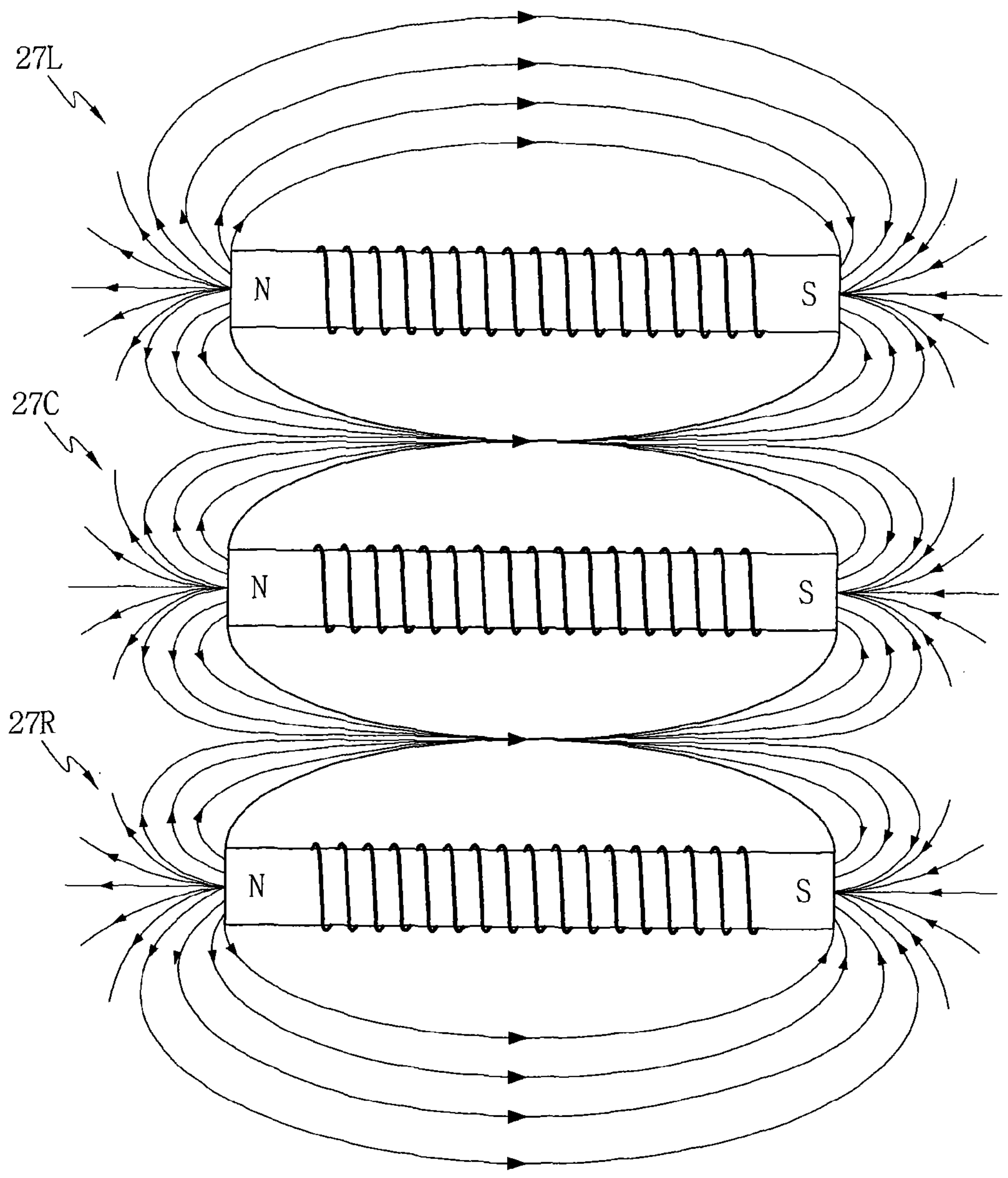

FIGS. 3A and 3B are views conceptually illustrating a magnetic field in the electromagnets 27C, 27L, and 27R of the droplet generators 20. Referring to FIGS. 3A and 3B, the electromagnets 27C, 27L, and 27R may be disposed to have the N pole and the S pole in the same directions. Accordingly, since the same magnetic poles are close to each other, the electromagnets 27C, 27L, and 27R may have mutually repulsive forces.

FIGS. 4A to 4D are views illustrating various electromagnets 27C, 27L, and 27R according to various embodiments of the inventive concept. In detail, FIGS. 4A to 4D are views conceptually illustrating exchanging magnetic poles N and S according to winding directions of and/or current directions in coils 28C, 29L, and 29R. The electromagnets 27C, 27L, and 27R may each have one of a clockwise (right hand screw rule) or counterclockwise (left hand screw rule) coil winding direction and one of a positive (+) or negative (−) current direction. In the case of any combination of coil winding and current directions, the electromagnets 27C, 27L, and 27R may have the same magnetic poles in the same direction to have mutually repulsive forces. The droplet generator controller 70 may have current sources to determine the magnetic poles N or S of the electromagnets 27C, 27L, and 27R.

Figure 4A:
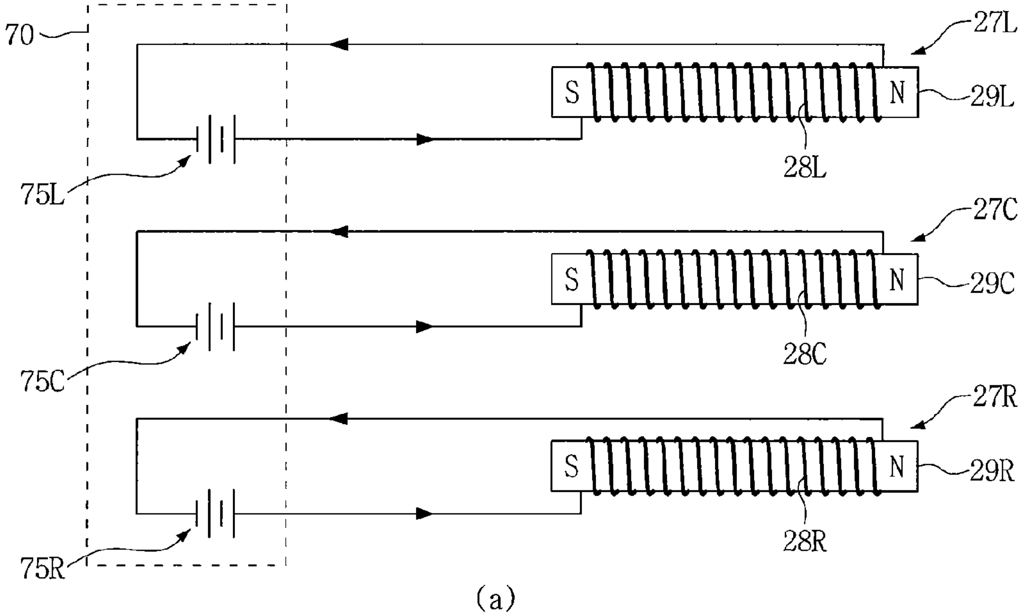
FIGS. 4A to 4D are views illustrating various electromagnets according to various embodiments of the inventive concept.
Figure 4A:
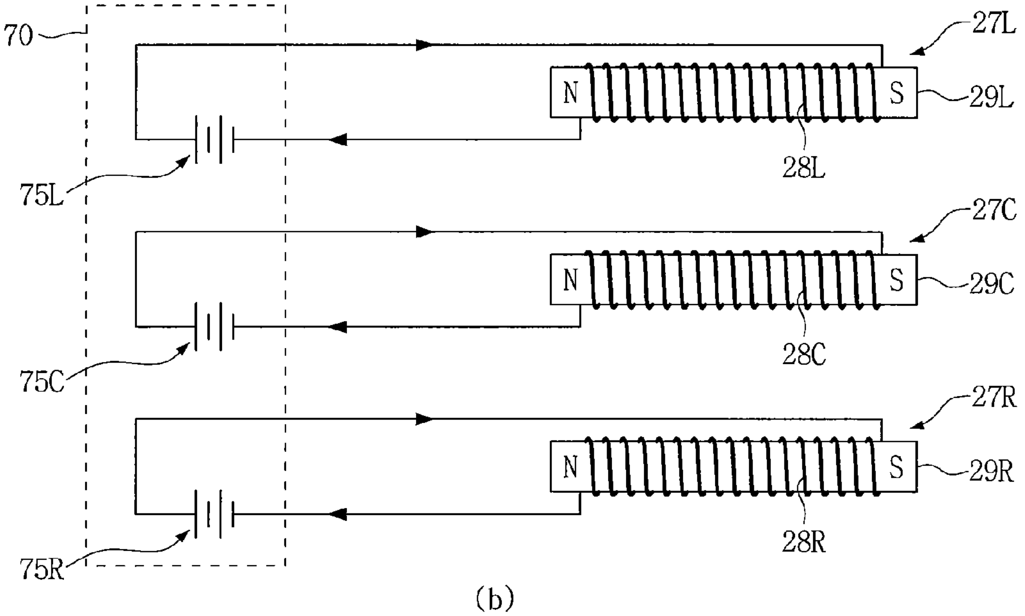

Referring to (a) and (b) of FIG. 4A, the central electromagnet 27C, the first side electromagnet 27L, and the second side electromagnet 27R may include coils 28C, 28L, and 28R respectively wound around cores 29C, 29L and 29R in a clockwise (right hand screw rule) direction. As shown in the above, the N and S poles may be determined according to current directions applied by the current sources 75C, 75L, and 75R of the droplet generator controller 70. The current directions are shown as arrows.

Figure 4B:
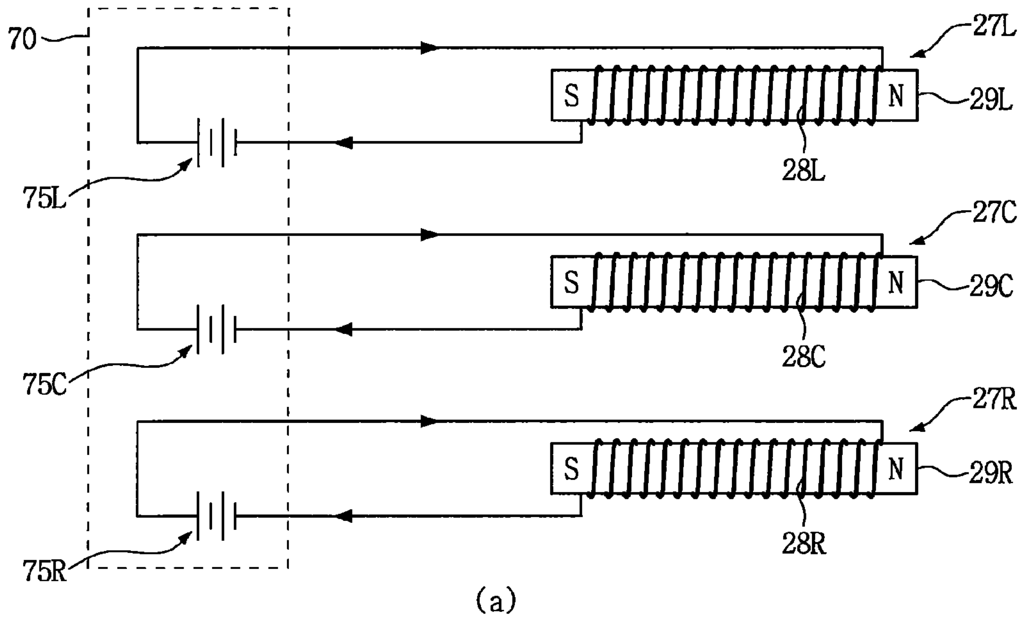
Figure 4B:
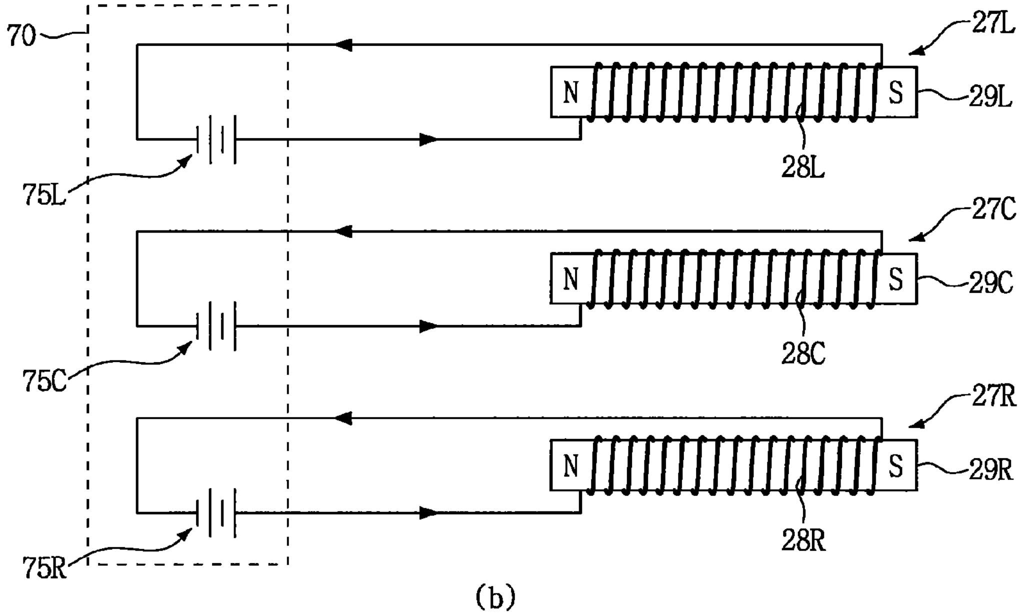

Referring to (a) and (b) of FIG. 4B, the central electromagnet 27C, the first side electromagnet 27L, and the second side electromagnet 27R may include coils 28C, 28L, and 28R respectively wound around cores 29C, 29L, and 29R in a counterclockwise (left hand screw rule) direction. As shown in the above, the N and S poles may be determined according to current directions applied by the current sources 75C, 75L, and 75R of the droplet generator controller 70.

Figure 4C:
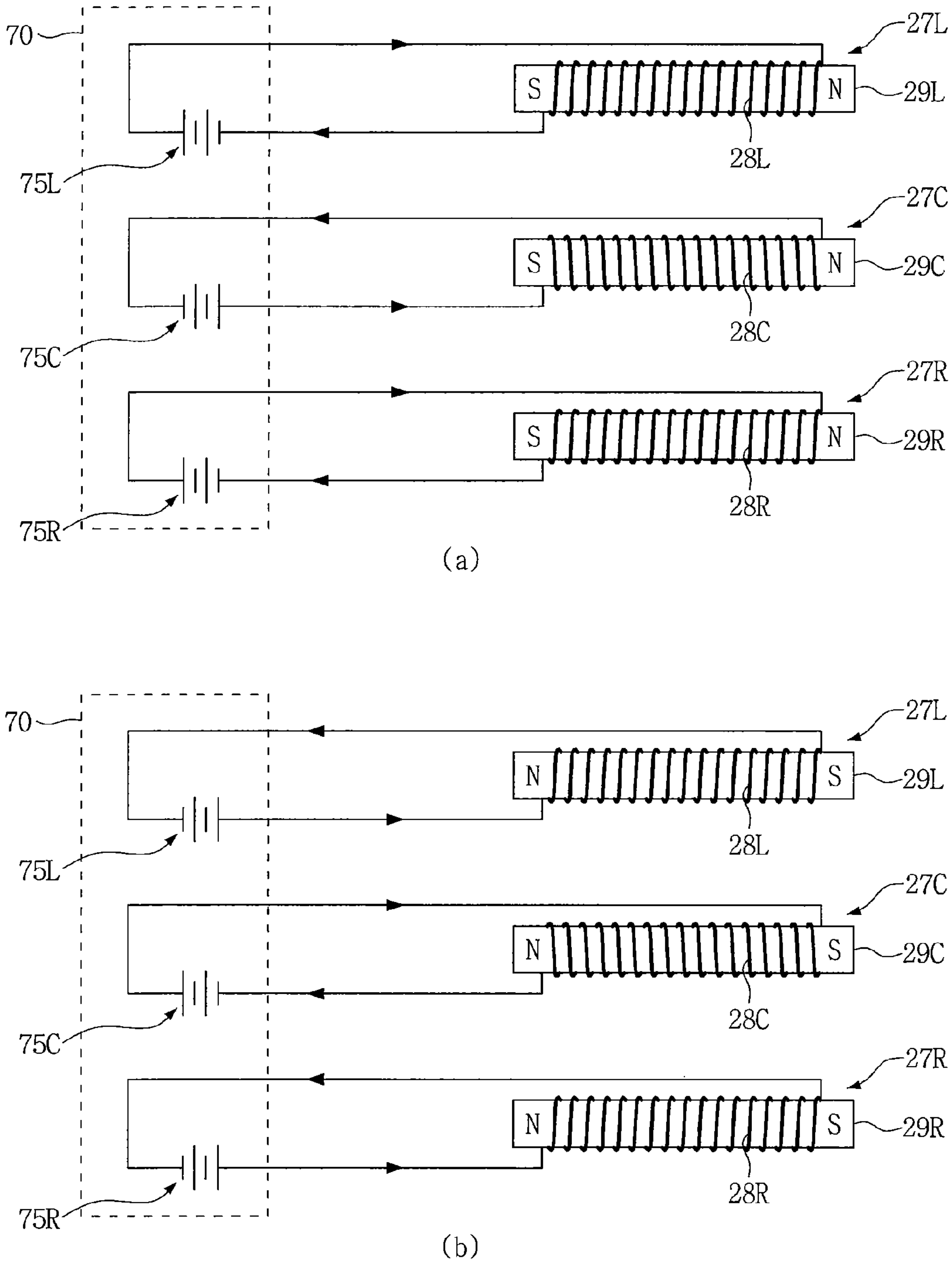

Referring to (a) and (b) of FIG. 4C, the central electromagnet 27C may include the central coil 28C wound around a central core 29C in a clockwise (right hand screw rule) direction. The first side electromagnet 27L and the second side electromagnet 27R may include the first and second side coils 28L and 28R respectively wound around the first and second side cores 29L and 29R in a counterclockwise (left hand screw rule) direction. Current directions of the central coil 28C of the central electromagnet 27C may be the reverse to those of the first side coil 28L of the first side electromagnet 27L and the second side coil 28R of the second side electromagnet 27R. Therefore, the central electromagnet 27C, the first side electromagnet 27L, and the second side electromagnet 27R may have the N and S poles in the same direction.

Figure 4D:
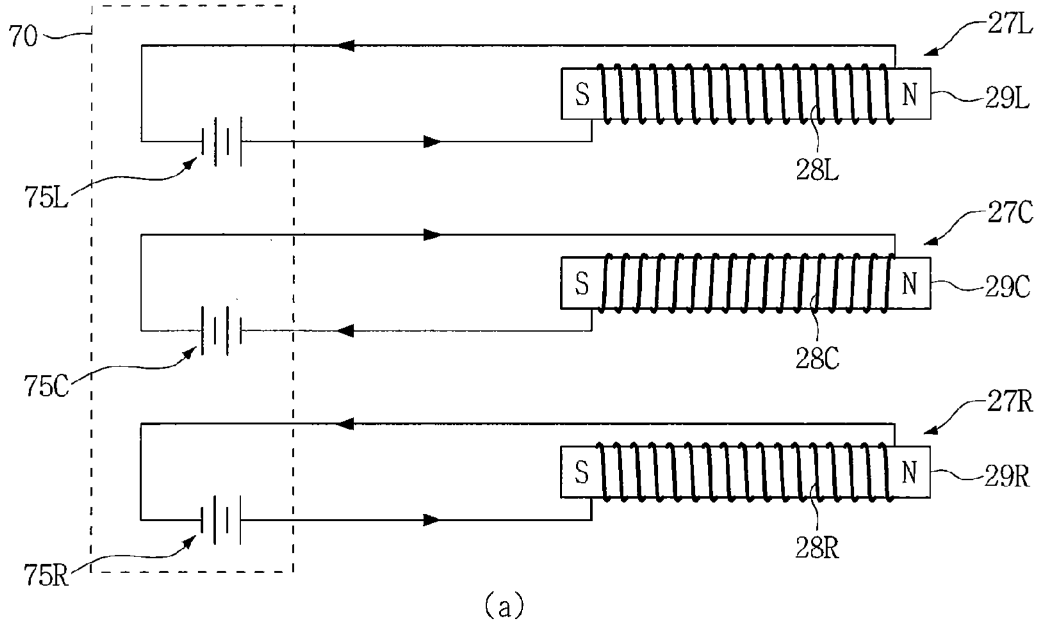
Figure 4D:
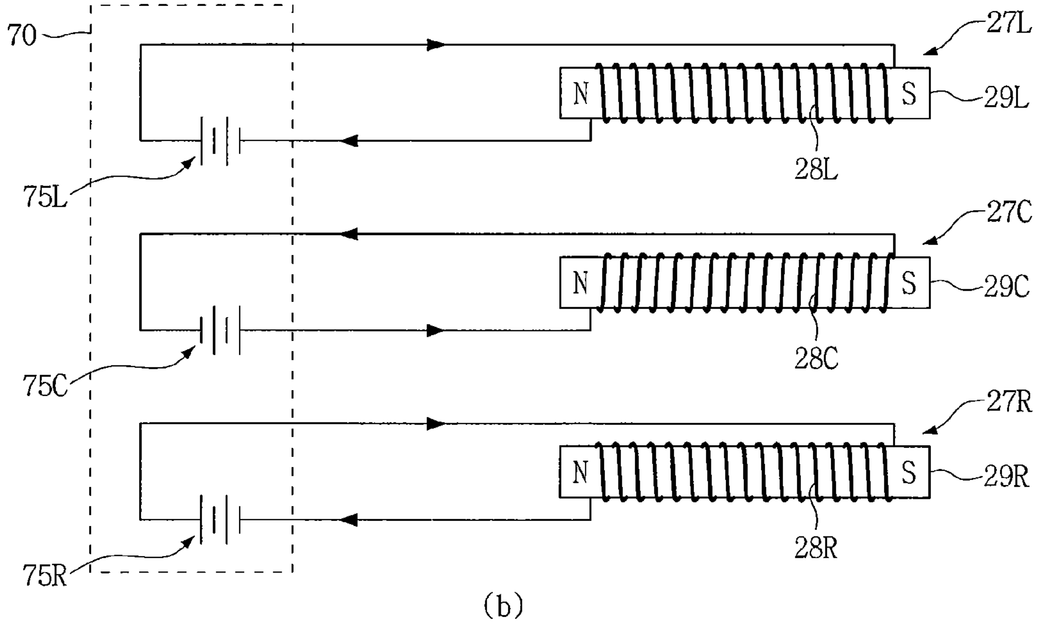

Referring to (a) and (b) of FIG. 4D, the central electromagnet 27C may include the central coil 28C wound around a central core 29C in a counterclockwise (left hand screw rule) direction. The first side electromagnet 27L and the second side electromagnet 27R may include the first and the second side coils 28L and 28R respectively wound around the first and the second side cores 29L and 29R in a clockwise (right hand screw rule) direction. Current directions of the central coil 28C of the central electromagnet 27C may be the reverse to those of the first side coil 28L of the first side electromagnet 27L and the second side coil 28R of the second side electromagnet 27R. Therefore, the central electromagnet 27C, the first side electromagnet 27L, and the second side electromagnet 27R may have the N and S poles in the same direction.

The droplet generator controller 70 may have the current sources 75C, 75L, and 75R which may control the magnetic force of the respective electromagnets 27C, 27L, 27R, and 27B. (The current source for controlling the magnetic force of the third side electromagnet 27B is omitted. However, the concept will be sufficiently understood from the various electromagnetic circuits shown in FIGS. 4A and 4B.) The current sources 75C, 75L, and 76R may supply the electromagnets 27C, 27L, 27R, and 27B with currents to set initial positions of the nozzles 24 in the droplet generators 20A to 20F. Further, The droplet generator controller 70 may analyze the image obtained from monitoring of the image camera 60, adjust the current of each of the current sources 75C, 75L, and 75R in real time, and control the magnetic forces of the electromagnets 27C, 27L, 27R, and 27B. When the currents supplied to the electromagnets 27C, 27L, 27R, and 27B are maintained constantly, the magnetic forces of the electromagnets 27C, 27L, 27R, and 27B are maintained constantly and the aiming points of the nozzles 24 may be self-aligned constantly and automatically.

Figure 5:
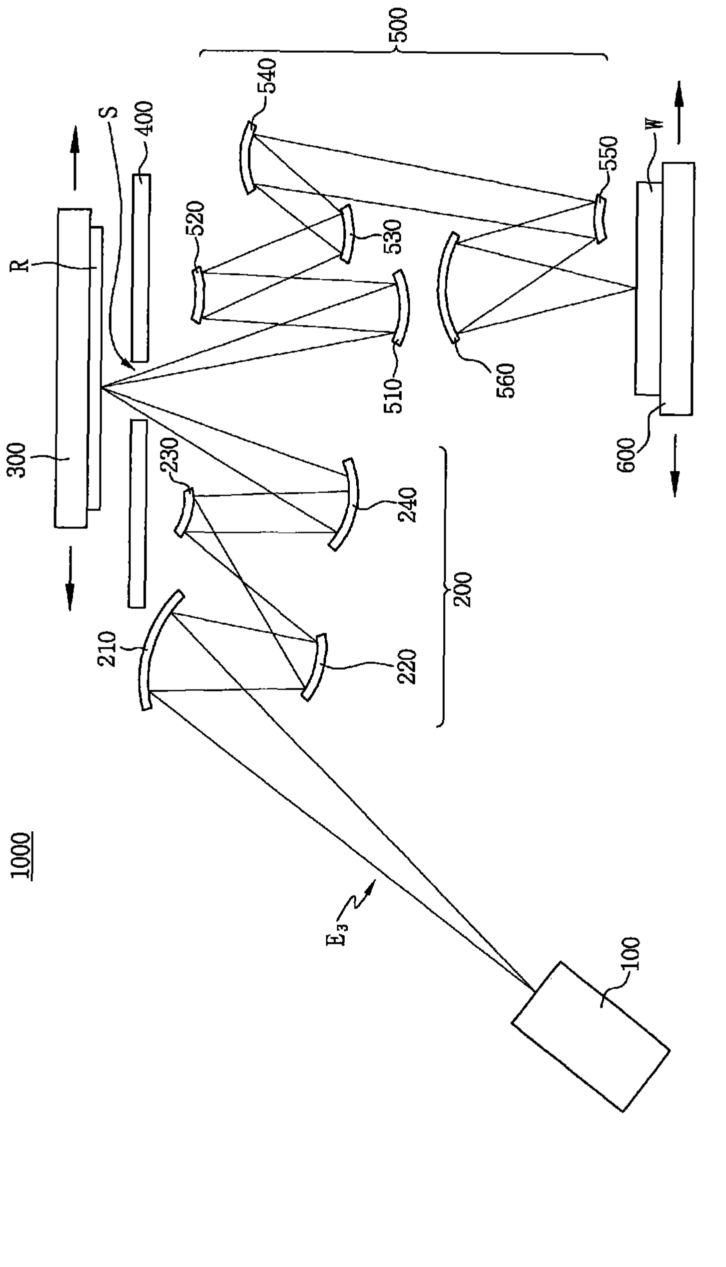
FIG. 5 is a view conceptually illustrating a reflective photolithography according to an embodiment of the inventive concept.

FIG. 5 is a view conceptually illustrating a reflective photolithography according to an embodiment of the inventive concept. Referring to FIG. 5, a reflective photolithography 1000 having the EUV light generator apparatus 100 according to the embodiment of the inventive concept may include the EUV light generator apparatus 100, an illumination mirror system 200, a reticle stage 300, a blinder 400, a projection mirror system 500, and a wafer stage 600. The EUV light generator apparatus 100 may include one of the droplet generators 20A to 20F according to various embodiments of the inventive concept. The EUV light E3 generated from the EUV light generator apparatus 100 may be irradiated to the illumination mirror system 200. The illumination mirror system 200 may include a plurality of illumination mirrors 210 to 240. The illumination mirrors 210 to 240, for example, may condense and deliver the EUV light E3 to reduce loss of the EUV light E3 out of an emitting path. Further, the illumination mirrors 210 to 240, for example, may uniformly adjust the distribution of intensity of the EUV light E3 in general. Accordingly, a plurality of the illumination mirrors 210 to 240 may each include a concave mirror and/or a convex mirror to form various paths of the EUV light E3. The reticle stage 300 may mount a reticle R on a lower surface thereof and move in a horizontal direction. For example, the reticle stage 300 may move in a direction of the arrows in the drawing. The reticle stage 300 may include an electro static chuck (ESC). The reticle R may include optical patterns on one surface thereof. The reticle R is mounted on a lower surface of the reticle stage 300 so that the surface having optical patterns of the reticle R is facing a downward direction. The blinder 400 may be disposed under the reticle stage 300. The blinder 400 may include a slit S. The slit S may be in a aperture shape. The slit S may form a shape of the EUV light E3 to be delivered from the illumination mirror system 200 to the reticle R on the reticle stage 300. The EUV light E3 emitted from the illumination mirror system 200 may be irradiated to the surface of the reticle R on the reticle stage 300 through the slit S. The EUV light E3 to be reflected by the reticle R on the reticle stage 300 may travel to the projection mirror system 500 through the slit S. The projection mirror system 500 may receive the EUV light E3 reflected by the reticle R through the slit S and deliver the received light to a wafer W. The projection mirror system 500 may also include a plurality of projection mirrors 510 to 560. The plurality of the projection mirrors 510 to 560 may correct various aberrations. The wafer stage 600 may move in a horizontal direction. For example, the wafer stage 600 may move in a direction of the arrows in the drawing. Paths of the EUV light in the drawing are conceptually illustrated to understand an aspect of the inventive concept easily.

The nozzles of the droplet generators according to various embodiments of the inventive concept can be automatically self-aligned by the electromagnets. Therefore, the nozzles of the droplet generators according to various embodiments of the inventive concept can always have a certain position.

Aiming points of the nozzles may be finely controlled by electromagnets according to various embodiments of the inventive concept. Therefore, the aiming points of the nozzles can be finely controlled.

Since the nozzles of the droplet generators according to various embodiments of the inventive concept are aligned by the magnetic forces of the electromagnets, the nozzles can always be aligned and maintained at a certain position even when external shocks are applied.

The nozzles of the droplet generators according to various embodiments of the inventive concept may have a very short response delay time due to being controlled by a current not depending on a mechanical motor, etc.

The foregoing is illustrative of embodiments of the inventive concept with reference to the accompanying drawings. Although a number of embodiments have been described, those of ordinary skill in the art will readily understand that many modifications are possible in embodiments without materially departing from the novel teachings and advantages. Therefore, it is to be understood that the foregoing is illustrative of various embodiments and is not to be construed as limiting to the specific embodiments disclosed.

What is claimed is:

1. An extreme ultraviolet (EUV) light generator apparatus, comprising:

a droplet nozzle;

a central electromagnet comprising a central coil wound around the droplet nozzle; and a droplet generator comprising side electromagnets around the central electromagnet.

2. The apparatus of claim 1, wherein the droplet generator further comprises:

a first side plate and a second side plate separated from the droplet nozzle and disposed on respective opposite sides of the droplet nozzle; and a shroud comprising a third side plate disposed under the droplet nozzle.

3. The apparatus of claim 2, wherein the side electromagnets comprise:

a first side electromagnet comprising a first side coil wound around the first side plate; and a second side electromagnet comprising a second side coil wound around the second side plate.

4. The apparatus of claim 3, wherein the side electromagnets further comprise a third side electromagnet comprising a third side coil wound around the third side plate.

5. The apparatus of claim 3, wherein:

the first side plate and the second side plate comprise a first side slit and a second side slit, respectively; and the first side coil and the second side coil are passed through the first side slit and the second side slit, respectively.

6. The apparatus of claim 2, wherein the side electromagnets comprise:

a first side electromagnet adjacent to the first side plate; and a second electromagnet adjacent to the second side plate.

7. The apparatus of claim 6, wherein:

the first side electromagnet comprises a first side core and a first side coil wound around the first side core; and the second side electromagnet comprises a second side core and a second side coil wound around the second side core.

8. The apparatus of claim 1, wherein the central electromagnet comprises magnetic poles in the same directions as magnetic poles of the side electromagnets so as to have mutually repulsive forces.

9. The apparatus of claim 1, further comprising a droplet generator controller comprising current sources supplying the central electromagnet and the side electromagnets with a current.

10. The apparatus of claim 9, wherein the current sources comprise:

a central current source which supplies a current to the central electromagnet; and side current sources which supply currents to the side electromagnets.

11. An extreme ultraviolet (EUV) light generator apparatus comprising:

a chamber;

a droplet generator configured to continuously shoot droplets into the chamber;

a laser source configured to project a laser into the chamber to be irradiated to the droplets;

a collecting mirror configured to collect EUV light generated in the chamber and reflect the EUV light outside the chamber; and a droplet collector configured to collect the droplets, wherein the droplet generator comprises:

a central electromagnet; and a first side electromagnet disposed in a first side direction of the central electromagnet and a second side electromagnet disposed in a second side direction of the central electromagnet.

12. The apparatus of claim 11, wherein the droplet generator comprises:

a droplet nozzle; and a shroud having a first side plate, a second side plate, and a third side plate configured to surround both sides and a bottom of the droplet nozzle, wherein the central electromagnet comprises a central coil wound around the droplet nozzle.

13. The apparatus of claim 12, wherein:

the first side electromagnet comprises a first side coil wound around the first side plate of the shroud; and the second side electromagnet comprises a second side coil wound around the second side plate of the shroud.

14. The apparatus of claim 11, further comprising an image camera configured to obtain an image of the droplets to which the laser is irradiated.

15. The apparatus of claim 11, further comprising a third side electromagnet disposed under the central electromagnet.

16. An extreme ultraviolet (EUV) light generator apparatus, comprising:

a chamber;

a droplet generator configured to continuously shoot droplets into the chamber;

a laser source configured to project a laser into the chamber so as to collide with a droplet and generate EUV light;

a collecting mirror configured to collect the EUV light and reflect the EUV light outside the chamber;

an image camera configured to obtain an image of the droplet; and a droplet generator controller configured to analyze the image and adjust a direction and frequency in which the droplet generator shoots the droplets into the chamber.

17. The apparatus of claim 16, wherein the droplet generator comprises a nozzle and at least one electromagnet, and wherein the droplet generator controller electromagnetically controls a position of the droplet generator nozzle via the at least one electromagnet.

18. The apparatus of claim 17, wherein the at least one electromagnet comprises a central electromagnet comprising a central coil wound around the droplet generator nozzle, first and second side electromagnets positioned on respective opposite sides of the droplet generator nozzle, and wherein the droplet generator controller comprises sources configured to supply current to the central electromagnet and the first and second side electromagnets.

19. The apparatus of claim 18, wherein the central electromagnet and the first and second electromagnets are arranged such that respective magnetic poles thereof are disposed in the same direction so as to have mutually repulsive forces.

20. The apparatus of claim 18, further comprising a shroud configured to surround the respective opposite sides of the droplet generator nozzle and a bottom of the droplet generator nozzle.

* * * * *